Sept. 26, 1950 E. C. HARTLEY ET AL 2,523,825

VALVE OPERATING MEANS

Filed Dec. 11, 1944 7 Sheets-Sheet 1

Inventors
Emmett C. Hartley,
Henry E. Hull.

By Mason, Porter & Diller
Attorneys

Sept. 26, 1950 E. C. HARTLEY ET AL 2,523,825

VALVE OPERATING MEANS

Filed Dec. 11, 1944 7 Sheets-Sheet 2

Inventors
Emmett C. Hartley,
Henry E. Hull.

By Mason, Porter & Diller
Attorneys

Sept. 26, 1950 E. C. HARTLEY ET AL 2,523,825

VALVE OPERATING MEANS

Filed Dec. 11, 1944 7 Sheets-Sheet 3

Inventors
Emmett C. Hartley,
Henry E. Hull.

By Mason, Porter & Diller
Attorneys

Sept. 26, 1950 E. C. HARTLEY ET AL 2,523,825

VALVE OPERATING MEANS

Filed Dec. 11, 1944 7 Sheets-Sheet 4

Inventors
Emmett C. Hartley,
Henry E. Hull.

By Mason, Porter & Diller
Attorneys

VALVE OPERATING MEANS

Filed Dec. 11, 1944 7 Sheets-Sheet 5

Inventors
Emmett C. Hartley,
Henry E. Hull.

By Mason, Porter & Diller
Attorneys

VALVE OPERATING MEANS

Filed Dec. 11, 1944

Inventors
Emmett C. Hartley,
Henry E. Hull.

By Mason, Porter & Diller
Attorneys

VALVE OPERATING MEANS

Inventors
Emmett C. Hartley,
Henry E. Hull.
By. Mason, Porter & Diller
Attorneys Patented Sept. 26, 1950

2,523,825

UNITED STATES PATENT OFFICE 2,523,825

VALVE OPERATING MEANS

Emmett C. Hartley and Henry E. Hull, Cleveland, Ohio, assignors to The Parker Appliance Company, Cleveland, Ohio, a corporation of Ohio Application December 11, 1944, Serial No. 567,681

11 Claims. (Cl. 318—2)

The invention relates generally to fluid distributing means, and more particularly to remotely controlled fluid distributing means of the character disclosed in the copending application filed by Robert H. Davies and Henry E. Hull on December 11, 1944, and identified by Serial No. 567,682, wherein is included a fluid distributing valve having a rotor and a multiple of ports and flow passages, valve rotor actuating means, a remote control means including devices simulating the porting arrangement in the remotely disposed valve, and a control rotor having flow passage simulating means thereon and being turnable to selected positions indicating selected flow passage positions and effective to condition the actuating means to place the flow passages in the positions selected by placement of the control rotor. Among other objects the invention seeks to provide fluid distributing means of the character stated wherein the valve rotor turns in one direction only and in which the control rotor can be turned clockwise or counterclockwise in effecting the selection of the position to which the valve rotor is to be turned.

Another object of the invention is to provide fluid distributing means of the character stated in which the valve rotor actuating means is driven by an electric motor, and wherein is included means for momentarily reversing the direction of rotation of the motor as the valve rotor attains its selected position of adjustment, thereby to eliminate objectionable coasting and assure accurate positioning of said rotor.

Another object of the invention is to provide fluid distributing means of the character stated in which the electrically driven drive means includes an over-running or uni-directional drive clutch which provides for the driving of the valve rotor in one direction only and permits the momentary reversing of the motor without imparting any reverse direction movement to the rotor.

Another object of the invention is to provide fluid distributing means of the character stated in which the valve and its actuating devices include separate housing portions connected in rigid assembly and in which there is included a manually operable valve rotor turning member projecting in readily accessible position between said housing portions and having means thereon visually indicating the placement of the flow passage in the valve rotor so that one manually operating the valve rotor can readily place said rotor passage in proper cooperative relation to the externally visible valve ports.

With the above and other objects in view that will hereinafter appear, the nature of the invention will be more clearly understood by reference to the following detailed description, the appended claims, and the several views illustrated in the accompanying drawings.

Figures 1, 22:
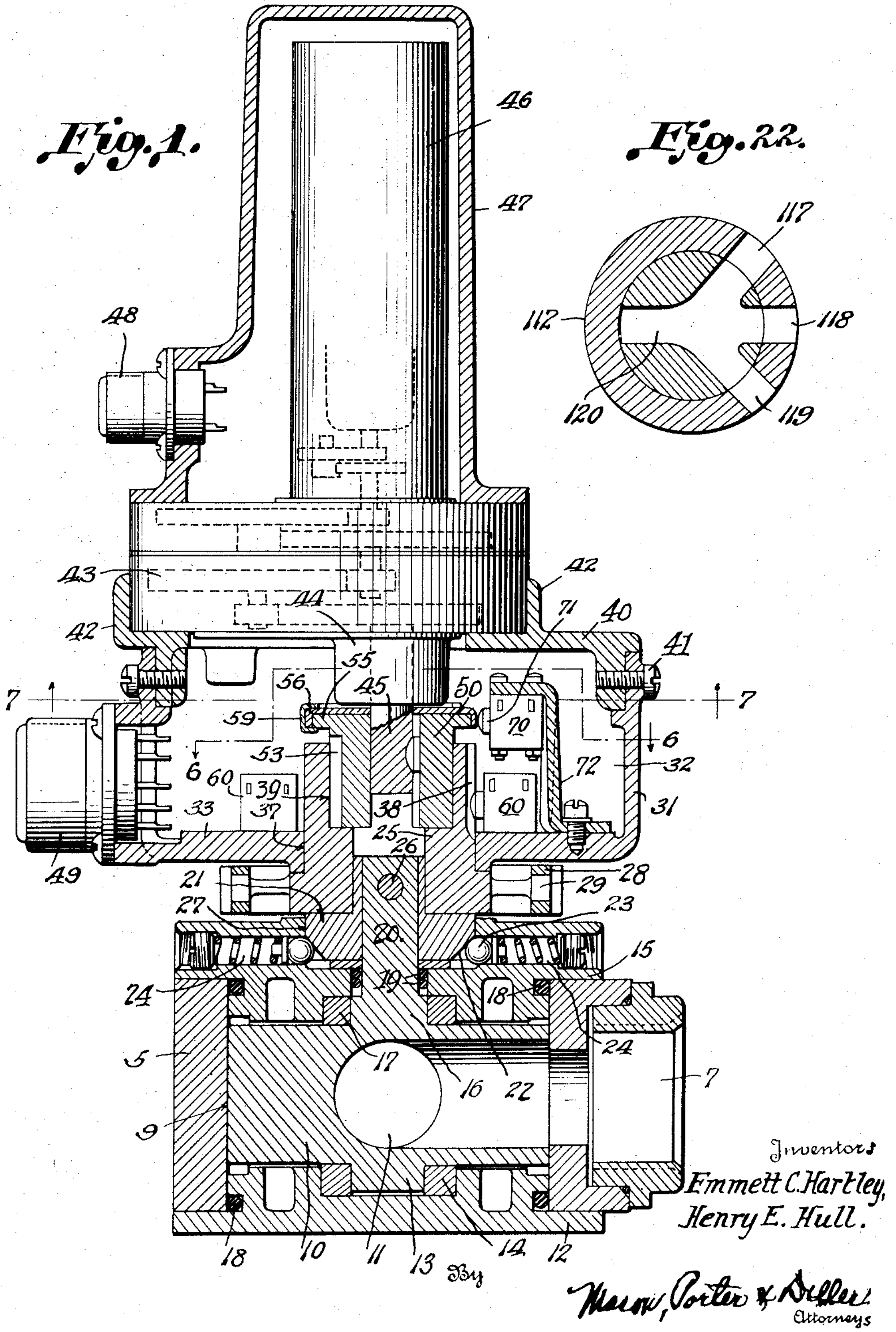
Figure 1 is a vertical cross sectional view illustrating the valve and its cooperating actuating means assembled in a compact rigid unit.
Figure 22 is a somewhat diagrammatic horizontal sectional view illustrating the rotor flow passages in the unit illustrated in Figures 16 through 21.
Figures 2, 3, 4:
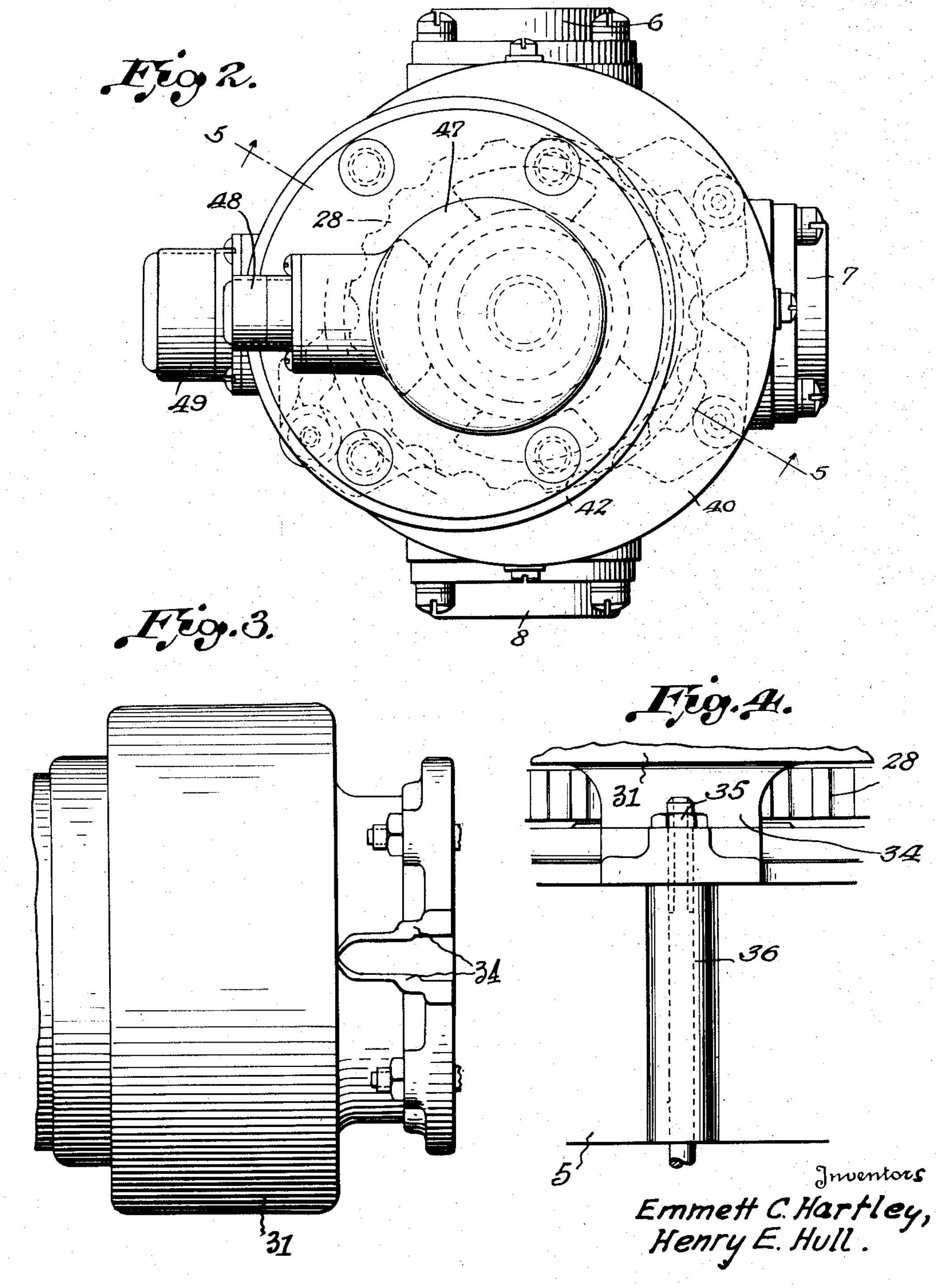
Figure 2 is a plan view of the unit illustrated in Figure 1.
Figure 3 is a fragmentary side elevation illustrating the drive housing of the unit.
Figure 4 is a fragmentary side elevation illustrating the manner of attaching the drive housing to the mounting lugs on the valve casing.
Figure 5:
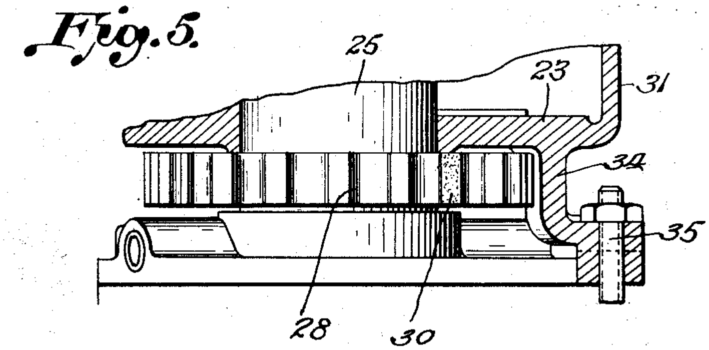
Figure 5 is a fragmentary vertical cross sectional view taken on the line 5—5 on Figure 2.

In the disclosure herein made of examples of embodiment of the invention there is illustrated in Figures 1 through 14 one of the valve and actuator units adapted to be electrically operated and remotely controlled. Said unit includes a valve casing 5 having three ports designated 6, 7 and 8 and arranged in a common plane and equidistantly spaced 90 degrees apart as is best illustrated in Figures 2 and 10 through 13. While this particular arrangement of valve porting is illustrated in this embodiment of the invention, it is to be understood that various forms of valve may be employed in this unit.

The valve casing is provided with a rotor chamber 9 in which a rotor 10 is mounted, said rotor being equipped with a T-shaped flow passage 11 which can be selectively adjusted to any of the four positions illustrated in Figures 10 through 13, and which cooperates with the casing ports 6, 7 and 8 in the manner illustrated in said figures.

The lower end of the casing is closed by a removable cap 12, and the rotor 10 includes a depending hub 13 which is rotatable in a non-metallic bearing 14 mounted in said cap. The upper end of the casing is closed by a removably mounted cap 15, and the rotor 10 includes an upwardly extending hub 16 which is rotatable in a non-metallic bearing 17 mounted in the cap 15. Groove mounted sealing rings 18 are provided in the respective caps 12 and 15 for effectively sealing the rotor chamber 9, and sealing rings 19 mounted in a bore surrounding the upwardly extending rotor stem 20 in the upper cap 15 seal the rotor chamber against leakage upwardly about said stem.

The upwardly extending rotor stem 20 has an index head 21 secured thereon, and this head may be equipped with four equi-distantly spaced peripheral recesses 22 for receiving spring pressed detents 23 mounted in bores 24 provided therefor in the cap 15 in the manner clearly illustrated in Figure 1. It will be apparent that the detent members 23 engage in the recesses 22 when the valve rotor is moved to any of the selected positions illustrated in Figures 10 through 13 so as to yieldably hold the rotor at its selected positions with the flow passage 11 thereof in proper registry with the selected ports 6, 7 and 8.

A hollow hub 25 also is mounted on the rotor stem 20 about an upward extension of the head 21, and the stem, said extension and the hub are secured to rotate in unison by means of a pin 26. The head 21 is rotatable in a recess 27 formed in the top of the cap 15, and the attached hub 25 includes a hand wheel or manual actuator portion 28 having spanner wrench or rod receiving apertures 29 in the periphery thereof. See Figures 1, 8 and 9. It will also be apparent by reference to Figures 5 and 8 that the rim of the wheel is marked as at 30 to indicate the positions of the portions of the rotor flow passage 11 which extend through the periphery of the rotor. By observing the relation of the wheel markings 30 and the casing ports 6, 7 and 8 it is possible to visually determine the position of the rotor flow passage hidden within the valve casing 5.

A drive housing 31 is provided and includes a drive chamber 32 formed within the side walls and above the bottom 33 of said housing. The bottom 33 is equipped with brackets or mounting lug extensions 34, and these are secured at 35 to the apertured mounting lugs 36 provided on the valve casing. See Figures 3, 4 and 5. This manner of assembling the valve casing 5 and the drive housing 31 places these parts in spaced relation with the actuator wheel 28 in readily accessible position between them in the manner clearly illustrated in Figures 1 and 5.

Figure 6:
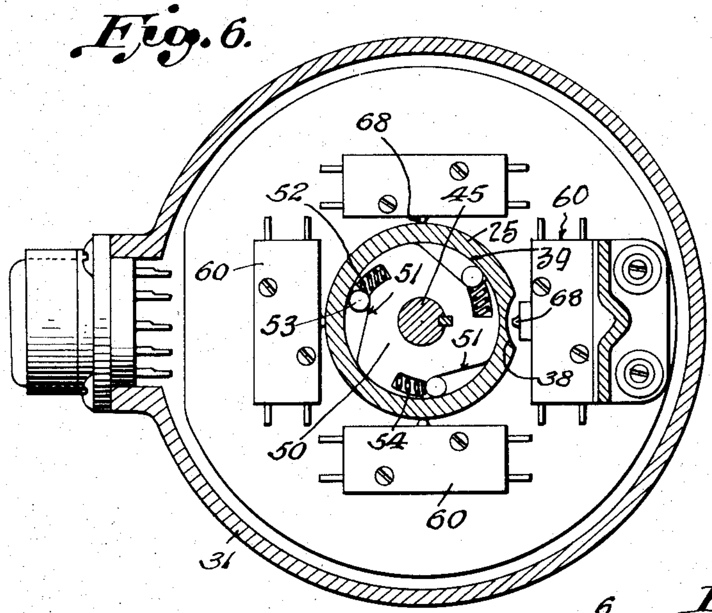
Figure 6 is a horizontal section taken on the line 6—6 on Figure 1.
Figure 10:
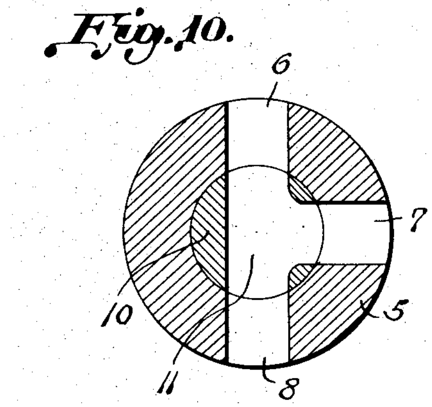
Figures 10, 11, 12 and 13 are somewhat diagrammatic horizontal sectional views illustrating the four selective positions at which the valve rotor of Figure 1 can be turned.
Figure 11:
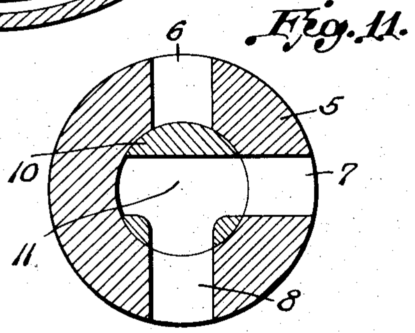
Figure 12:
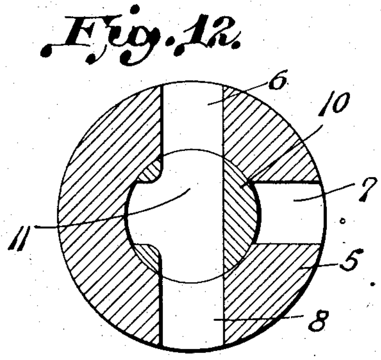
Figure 13:
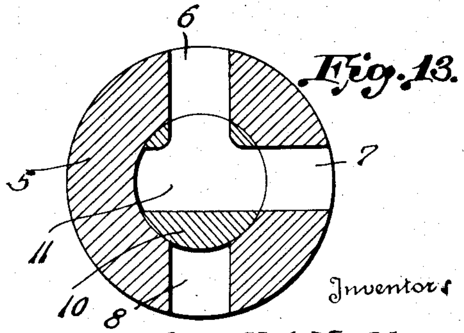

The wheel hub 25 extends upwardly into the drive chamber 32 through a bore 37 provided in the housing bottom 33, and the periphery of said hub within the drive chamber is equipped with a peripheral recess 38 extending in a direction paralleling the axis of the hub in the manner clearly illustrated in Figures 1 and 6. The purpose of this recess will become apparent as the description progresses.

The housing 31 is closed by a cover plate 40 secured thereon as at 41, and the cover plate is equipped with a seat 42 in which is mounted a reduction gearing unit generally designated 43. The gearing unit includes a depending bearing 44 through which the power output shaft 45 of the reduction gearing extends coaxially into the hub 25. An electric motor 46 is secured on the reduction gearing unit 43 and the drive shaft thereof imparts rotation to the power output shaft 45 through said gearing. The motor preferably is protected by an enclosing casing 47 mounted on the reduction gearing unit 43.

The motor protecting casing 47 is equipped with a control circuit inlet 48 through which electrical controls for the motor are introduced, and a similar control circuit inlet 49 is provided on the housing 31 through which suitable control connections enter the drive chamber 32. It is preferred that an electric motor of 1/50th horse power be employed and that the gearing unit 43 have a reduction capacity of 12 hundred to 1 so that the 12 thousand R. P. M. rotation of the motor shaft will be stepped down to 10 R. P. M. at the power output shaft 45. It will be apparent by reference to Figures 1 and 6 of the drawings that a rotor 50 is fixed on the power output or drive shaft 45 within the hollow hub 25 attached to the rotor stem 20. The rotor 50 is provided at its periphery with a plurality of cam clearances 51 terminating inwardly at abutment walls 52, and that a roller 53 is mounted in each clearance and cooperates with the cam surface thereof and the opposing interior wall of the hollow hub 25. Each roller is constantly urged by socket mounted spring means 54 in a direction for wedging between the rotor and the interior of the hub 25, and it will be apparent that the rotor 50, the rollers 53 and said hub provide an over-running clutch or uni-directional drive means which will cause the valve rotor 10 to be driven in one direction only by the motor, the motor being free to rotate in the opposite direction without imparting movement to the valve rotor.

Figures 7, 8, 9:
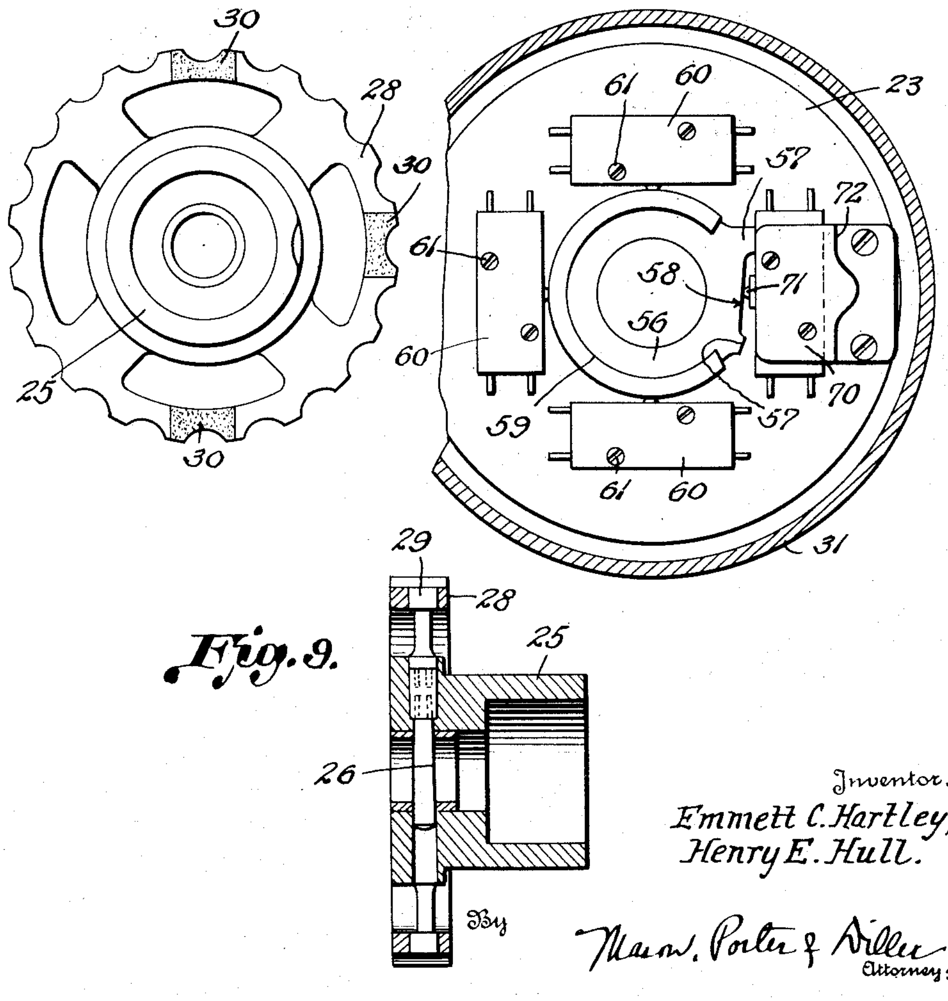
Figure 7 is a horizontal section taken on the line 7—7 on Figure 1.
Figure 8 is a plan view of the manually adjustable rotor turning wheel per se.
Figure 9 is a vertical cross sectional view illustrating the wheel shown in Figure 8.

A flange 55 extends horizontally from the rotor 50 above the hub 25, and a cam plate 56 rests upon said flange and the top of the head 50 in the manner clearly illustrated in Figures 1 and 7. The plate 56 is equipped with two circumferentially spaced stop lugs 57 and an intermediate cam surface 58 which extends in angular relation to the vertical as viewed in Figure 7. A flanged friction grip member 59 embraces the edge portions of the cam plate 56 and the flange 55 so as to frictionally press said cam plate against the top of the rotor 50. By reason of the provision of this equipment, each time the head 50 is driven by the motor in one direction or the other, the cam plate 56 will be caused to rotate with said head the limited distance permitted by the stop lugs 57, said lugs being disposed to come against stop means which will be described hereinafter and which are placed in the manner illustrated in Figure 7.

Four motor cut out switches 60, one thereof being provided for each of the four selective positions of the valve rotor, are grouped about the hub 25 and secured on the housing bottom 33 as indicated at 61 in Figure 7. The internal construction of these motor cut out switches is well known, and one of the switches is illustrated in section in Figure 14. Each said switch includes four contacts 62 arranged in spaced pairs and connected with connector terminals 63 by which connection with the control conductors can be effected in the well known manner. Between the opposed pairs of contacts 62 there is mounted a leaf spring contactor 64 having contacts or buttons 65 at its ends and being provided with inwardly opposed spring leaves 66 which engage as at 67 with the respective actuator button 68. A coil spring 69 constantly urges the button 68 against the hub 50 so that when the head clearance 38 comes opposite the button, said spring will be effective to reverse the position of the contactor element 64 from its position in contact with the inwardly disposed pair of contacts 62 to a position in which it will contact the outwardly disposed pair of contacts 62, thereby to open the selected control circuit and stop rotation of the motor.

A motor reversing switch 70 which is identical in construction to the motor cut out switches above described is disposed with its actuator button 71 presented for engagement by the cam surface 58 of the cam plate 56. The motor reversing switch 70 is mounted on a bracket 72 within the drive chamber 32 in the manner clearly illustrated in Figures 1, 6 and 7. This switch acts as a stop abutment for the cam plate lugs 57.

The wiring within the drive housing chamber 32 and the motor shell 47 has been omitted in Figures 1, 6 and 7 in the interest of clarity of the disclosure. The manner of electrically connecting the valve and drive unit with the remote control device is diagrammatically illustrated in Figure 15.

Figures 14, 15:
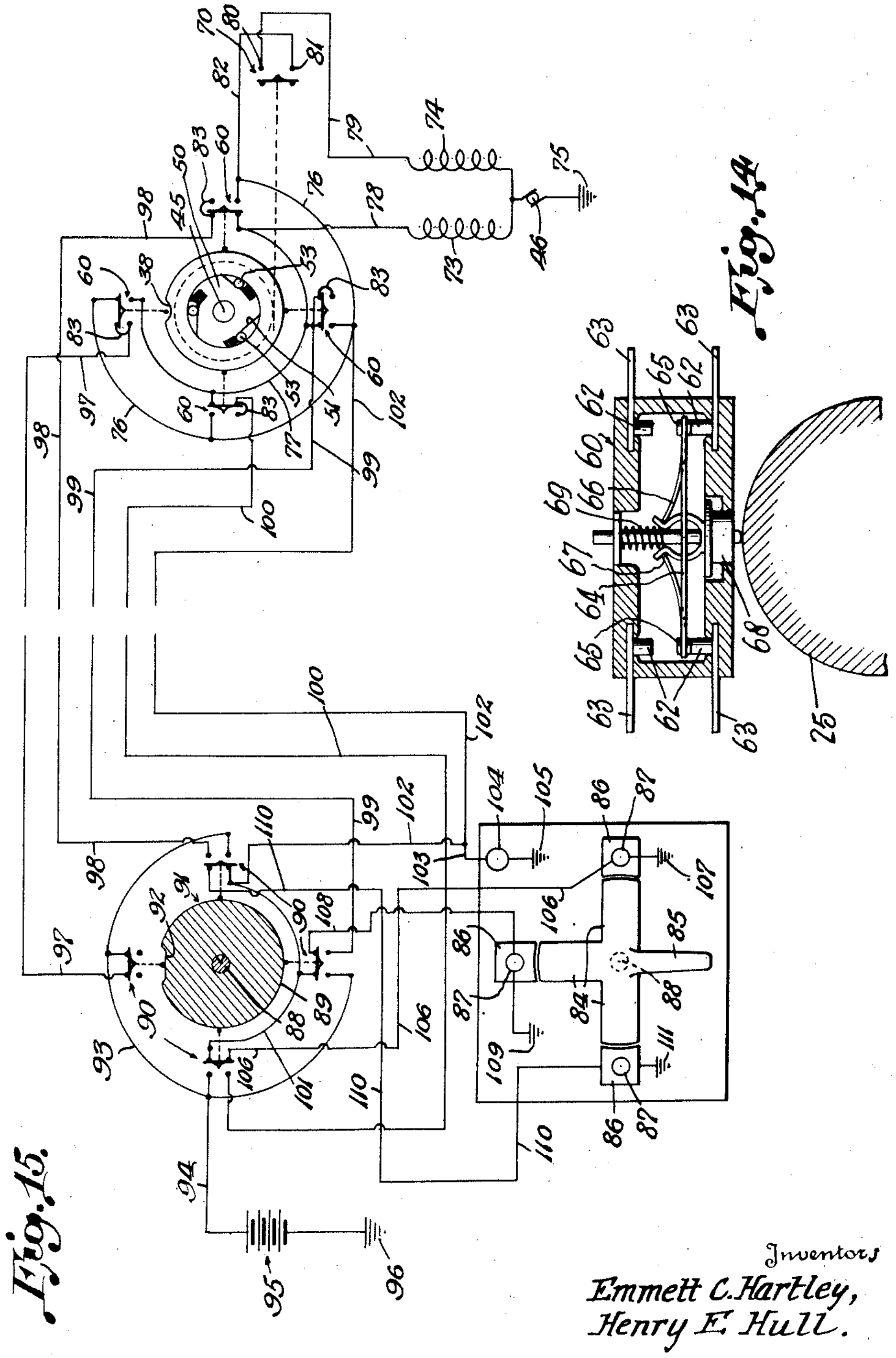
Figure 14 is a detailed sectional view illustrating one of the control switches.
Figure 15 is a schematic diagram showing the electrical connection of the unit of Figures 1 to 9 with a remote control means.

In the schematic diagram in Figure 15 the forward and reverse winding fields of the motor 46 are indicated at 73 and 74 respectively, and the motor circuit is grounded as at 75. One contact of each outer pair of contacts of the motor cut out switches 60 is connected to a jumper conductor 76, and one contact of each inner pair of contacts of the switches 60 is connected to a jumper conductor 77. The jumper conductor 77 is connected as at 78 with the forward winding field 73 of the motor. The other or reverse winding field 74 of the motor is connected as at 79 to one contact 80 of the outer pair of contacts 80, 81 of the reversing switch 70. The other outer contact 81 of said switch is connected as at 82 to the jumper conductor 76. The remaining inner and outer contacts of the opposed pair of contacts in the motor cut out switches 60 are cross connected as at 83.

The remote control means includes a selector and indicator rotor having a valve rotor flow passage simulating means 84 and an operating handle 85 by which said means can be turned relative to the valve port position simulating pieces 86 so as to set the control devices to effect a turning of the valve rotor to the position indicated by the selected placement of the rotor means 84. Each of the valve port simulating pieces 86 preferably may be lighted by a signal lamp 87. In practice the rotor is mounted on a shaft 88 which has a selector disk 89 fixed thereon in the manner indicated at the upper left hand portion of Figure 15. This disk is surrounded by four selector switch units each corresponding to one of the motor cut out switch units 60 and the associated individual position to which the valve rotor is turnable. It should be understood also that the selector switches 90 are identical in construction to the motor cut out switches 60 but are reversely connected in the control circuits so that when a given selector switch is closed, the corresponding motor cut out switch will automatically open and break the selected motor driving circuit when the hub clearance 38 comes opposite the button of the particular cut out switch as the valve rotor reaches the position for which the controls are adjusted. The periphery 91 of the selector disk 89 normally forces the actuator buttons of the selector switches 90 outwardly so as to place the contact making and breaking members in the motor circuit breaking position as illustrated at the right, left and bottom center of the selector switch arrangement shown at the upper left hand corner in Figure 15. The selector disk 89 is provided with a single peripheral recess 92 which is effective when it comes opposite a selected switch 90 to free the actuator button thereof and allow the spring in the switch to force the button inwardly, thereby to place the contact making and breaking element across the outer pair of contacts in the motor circuit completing position illustrated at the top center in the selector switch illustration.

One contact of each outer pair of the selector switch contacts is connected to a jumper conductor 93 which is in turn connected as at 94 with a source of power designated 95, said power source being grounded as at 96. The other contact of each outer pair of selector switch contacts is connected by individual conductors 97, 98, 99 and 100 respectively to the cross connections 83 of the motor cut out switches 60 hereinbefore referred to. One contact of each inner pair of the contacts of three of the selector switches is connected with a jumper conductor 101, and this conductor is connected as at 102 with the motor cut out circuit jumper 76 hereinbefore referred to, and at 103 with an index lamp 104 which is grounded as at 105. It is to be understood that the control wiring is so arranged that the index lamp 104 will be lighted each time the valve rotor comes to rest at any selected position, thereby to visually indicate to an operator that the valve rotor position for which he has selectively set the controls has been attained. The other contact of one of the inner pairs of selector switch contacts, namely the one at the left hand side of the selector disk 91, is connected as at 106 with the signal lamp 87 associated with the port simulating piece at the right hand side of the control rotor, and this lamp is grounded as at 107. Another of the contacts of the inner pairs is connected as at 108 with the signal lamp 87 associated with the centrally disposed valve port simulating piece 86, and this lamp is grounded as at 109, one of the inner contacts of the remaining selector switch, namely the one at the right of the disk 91, is connected as at 110 with the remaining signal lamp 87 associated with the valve port simulating piece 86 at the left of the control rotor, and this lamp is grounded as at 111.

In the diagrammatic illustration in Figure 15 the valve and actuating unit parts and the remote control means electrically connected therewith are shown in condition for having brought about the valve position indicated by the registration of the flow passage and port simulating pieces 84 and 86 at the lower left hand portion of said Figure 15. In this position all three valve ports are in communication as in Figure 10, the index lamp 104 is lighted through 95, 94, 93, the top center selector switch 90, 97, the top center cut out switch 60, 76, 102, 103, 104, 105 and 96. All three port signal lamps 87 are lighted. One through 95, 94, 93, the top top center selector switch 90, 97, the top center cut out switch 60, 76, 102, the right hand selector switch 90, 110, 111 and 96. The second of said lamps 87 is lighted through 95, 94, 93, the top center selector switch 90, 97, the top center cut out switch 60, 76, 102, 101, the bottom center selector switch 90, 108, 109 and 96. The third of said lamps 87 is lighted through 95, 94, 93, the top center selector switch 90, 97, the top center cut out switch 60, 76, 102, 101, the left hand selector switch 90, 106, 107 and 96. The motor reversing switch button will have been moved by reverse movement of the cam plate 56 at the conclusion of the preceding indexing cycle to press the button 71 outwardly and move the contact making and breaking member inwardly so as to break the motor reversing circuit across the contacts 80 and 81 as indicated in Figure 15.

Assuming that it is now desired to turn the valve rotor to connect only the two ports simulated at the left and right of the control rotor at the lower left hand corner of Figure 15, the operator would turn the control rotor 180 degrees, thereby to indicate on the control devices the position to which the valve rotor is to be turned and set the control devices so as to effect such a turning of the valve rotor. This 180 degree movement of the selector disk 89 will reverse the positions of the top center and lower center selector switches 90 indicated at the upper left hand corner in Figure 15. By thus closing the bottom center selector switch 90, all the remaining selector switches 90 then being in the open position in which the inner pairs of contacts are bridged, a motor driving circuit will be established through 95, 94, 93, the bottom center selector switch 90, 99, the bottom center cut out switch 60, 77, 78, the forward motor winding 73, 75 and 96, thus causing the motor to turn forwardly and impart rotation to the valve rotor through the overrunning clutch 51, 53, 25. The control rotor is turnable in either direction.

The first 20 degrees of turning movement of the cam plate 56 will move the same to the position illustrated in Figure 7 and allow the spring in the motor reversing switch 70 to move the actuator button of the switch inwardly and cause the contact piece to move outwardly and bridge the contacts 80 and 81 in the motor reversing line 82, 79 leading to the reverse motor winding 74. The valve rotor will be driven through the uni-directional driving connections 50, 53, 25 until the recess 38 of the hub 25 comes opposite the actuator button of the selected bottom center motor cut out switch 60, at which time the button of said switch will be free to move inwardly and effect a breaking of the forward motor driving circuit by moving the contact piece away from the inner pair of contacts outwardly into engagement across the outer pair of contacts, or to the position shown at the top right center in Figure 15. At this time the cut out switches 60 at the top center and at the right and left of the rotor driving means will have their contact pieces positioned for bridging across the inner pairs of contacts so as to connect them with the jumper conductor 77. At this moment a motor reversing circuit will be completed through 95, 94, the bottom selector switch 90, 99, the bottom center cut out switch 60, 76, 82, 80, 81, 79, the reverse motor winding 74, 75 and 96, momentarily reversing the motor and causing the cam plate 56 to move a few degrees in reverse direction and force the button 71 of the reversing switch outwardly so as to force the contact piece inwardly and break the reversing circuit across the contacts 80 and 81. This completes the rotor indexing cycle.

With the circuits conditions as just described, the port light 87 at the left will be lighted through 95, 94, 93, the bottom center selector switch 90, 99, the bottom center cut out switch 60, 76, 102, the right hand selector switch 90, 110, 111 and 96. This condition of the circuits also serves to light the index lamp 104 through 103, 105 and 96. The port light 87 at the right will be lighted through 95, 94, 93, the bottom center selector switch 90, 99, the bottom center cut out switch 60, 102, 101, the left hand selector switch 90, 106, 107 and 96.

The foregoing brief description should suffice to make it apparent how the movement of the valve rotor is controlled remotely, how attainment of the selected position of the rotor is signaled by the indexing lamp, and how the lamps 87 and passage simulating means 86 and 84 clearly indicate the exact relative positions of the rotor flow passage and the ports at any given time.

In Figures 16 through 21 of the drawings there is illustrated a modified form of the invention in which the general assembly of the valve and actuator unit is substantially the same as the unit hereinbefore described, and in this assembly the valve unit is generally designated 112 and is secured by brackets 113 in spaced relation to the drive housing 114 whereon is mounted the reduction gearing generally designated 115 and the protectively housed driving motor generally designated 116.

Figures 16, 20, 21:
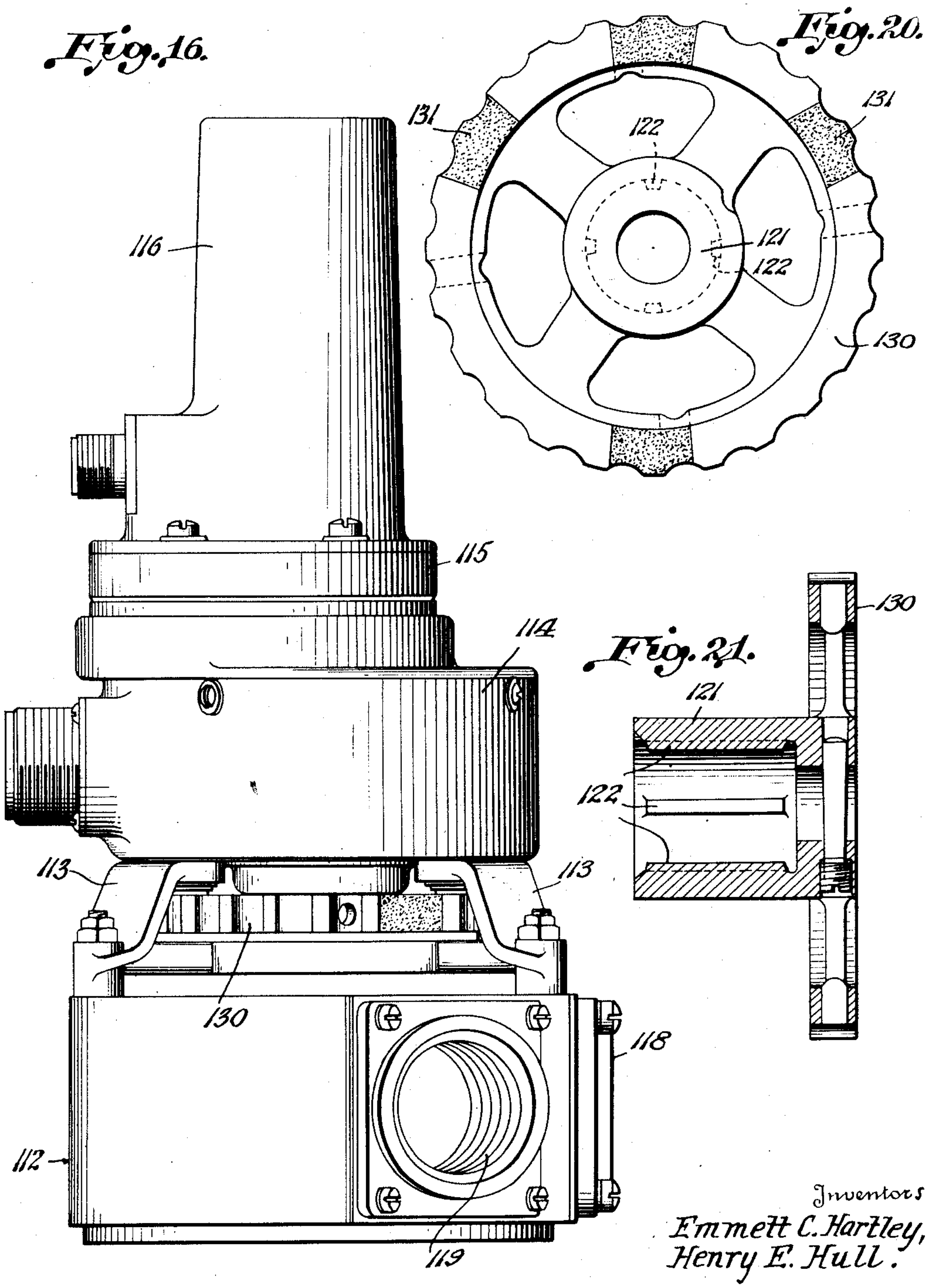
Figure 16 is a side elevation illustrating a modified form of valve and actuator unit.
Figure 20 is a plan view, and Figure 21 a vertical cross section illustrating the manually adjustable rotor turning wheel.
Figures 17, 18, 19:
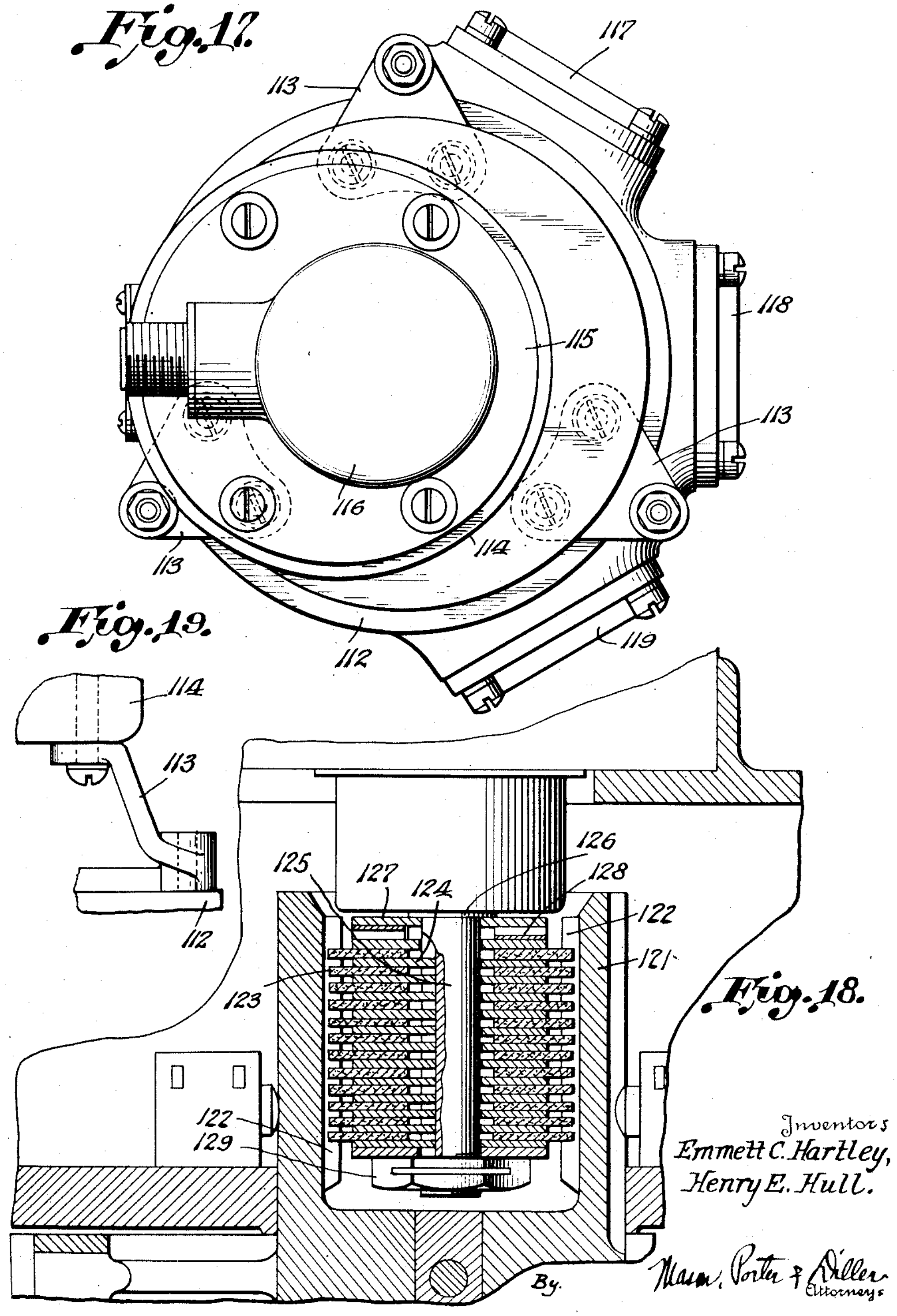
Figure 17 is a plan view of the unit shown in Figure 16.
Figure 18 is a fragmentary vertical cross sectional view illustrating the slip clutch drive connection.
Figure 19 is a fragmentary side elevation illustrating a single bracket connection between the drive housing and the valve casing.

As previously stated, various arrangements of valve porting and rotor flow passages may be employed and in this modified form a valve is disclosed which is equipped with three ports respectively designated 117, 118 and 119 and arranged in a common plane and equi-distantly spaced 60 degrees apart as will be apparent by reference to Figures 16, 17 and 22. The rotor is equipped with a crow foot flow passage 120 and may be placed by remote control by means such as is disclosed in the copending application for United States Letters Patent above referred to to selectively place the flow passage in any one of six selective positions with relation to the ports 117, 118 and 119 as described in said application.

In this modified form of the invention, a disk-type slip clutch is employed instead of the uni-directional drive or over-running clutch employed in the form of the invention previously described herein. This form of slip clutch connection between the rotor and the power output shaft of the reduction gearing makes it possible to rotate the valve rotor manually and independently of the motor drive in either direction. A hollow hub 121 is secured to turn with the valve rotor, and this hub is equipped with a plurality of ribs 122 extending inwardly in the hollow portion thereof in the manner best illustrated in Figures 18, 20 and 21. The hub ribs engage in edge notches formed in a plurality of fiber disks 123 which, together with the interleaved metal disks 124, surround the depending drive shaft or power output shaft 125 of the reduction gearing. The shaft 125 has an enlarged head 126 engaged by an abutment member 127 which forms an abutment for a wavy spring washer 128 interposed between said abutment member and the pack of disks 123, 124, and the disks are held in the desired frictional contact by a nut 129 secured on the end of shaft 125. The metal disks 124 are turnable with the shaft 125.

As in the previously described form of the invention, the hub 121 is equipped with a rotor adjusting wheel portion 130 which is disposed between the spaced drive housing and valve casing portions in the manner illustrated in Figure 16 so as to be readily accessible to an operator desiring to manually adjust the position of the valve rotor. In order to enable the operator to determine how to manipulate the valve rotor through the medium of the hand wheel 130, said wheel is provided with marking 131 on the rim thereof corresponding to the positions of the portions of the rotor flow passage 120 opening through the periphery of the rotor in the manner illustrated in Figure 22. By observing the wheel markings 131 and the arrangement of the valve ports 117, 118 and 119, the operator may select the desired position of the rotor flow passage 120 with relation to said ports despite the fact that said flow passage is hidden within the valve casing.

In the foregoing description there is disclosed a simple form of valve and actuating means therefor which can be remotely controlled for placing the valve rotor flow passage in selected positions relative to the casing ports, means also being provided for clearly indicating the selected position to which the valve is to be turned at the remote control point, and also for indicating when the valve rotor has reached the selected position. In this control means the control element can be moved either clockwise or counterclockwise whereas the valve rotor will always be moved in the same direction toward the selected rotor position. Means also are provided for permitting manual actuation of the valve rotor independently of the remotely controlled power driven means.

While two forms of the invention have been shown for purposes of illustration, it is to be clearly understood that various changes in the details of construction and arrangement of parts may be made without departing from the spirit and scope of the invention as defined in the appended claims.

We claim:

1. In apparatus of the character described a rotor having a driver stem projecting therefrom and adapted to be rotated to a plurality of selective positions, power operated means for imparting rotation to the rotor for effecting said selective positioning thereof including a hub secured to said stem and uni-directional driving devices for driving said hub in one direction only, remotely disposed control and indicator means for controlling operation of the power operated means to effect said selective positioning of the rotor and for indicating at the remote control position the selected positions of said rotor, said control and indicator means including a rotatable element turnable clockwise or counterclockwise in effecting said control and rotor position indication, and means directly connected with said hub and operable manually independent of said power operated means and at the position of said rotor for rotating said rotor to effect independent manual selection of the position of the rotor without disturbing the drive couple between said power operated means and the rotor.

2. In apparatus of the character described a rotor having a driver stem projecting therefrom and adapted to be rotated to a plurality of selective positions, power operated means for imparting rotation to the rotor for effecting said selective positioning thereof including a hub secured to said stem and uni-directional driving devices for driving said hub in one direction only, remotely disposed control and indicator means for controlling operation of the power operated means to effect said selective positioning of the rotor and for indicating at the remote control position the selected positions of said rotor, said control and indicator means including a rotatable element turnable clockwise or counterclockwise in effecting said control and rotor position indication, and means directly connected with said hub and operable manually independent of said power operated means and at the position of said rotor for rotating said rotor to effect independent manual selection of the position of the rotor without disturbing the drive couple between said power operated means and the rotor, said manually operated means having direct marking thereon subject to placement relative to fixed indicating media to indicate the selected positioning of said rotor.

3. In apparatus of the character described a rotor having a driver stem projecting therefrom and adapted to be rotated to a plurality of selective positions, power operated means for imparting rotation to the rotor for effecting said selective positioning thereof including a hub secured to said stem and an electric motor, said hub being hollow, clutch means mounted in the hub to form a uni-directional drive connection between the motor and the stem for driving said rotor in one direction only, and remotely disposed control and indicator means for controlling operation of the power operated means to effect said selective positioning of the rotor and for indicating at the remote control position the selected positions of said rotor, said control means including motor cut out switches grouped about said hub, and means on said hub to actuate the switches selectively to stop operation of the motor when the valve rotor has reached its selected position.

4. In apparatus of the character described a rotor having a driver stem projecting therefrom and adapted to be rotated to a plurality of selective positions, power operated means for imparting rotation to the rotor for effecting said selective positioning thereof including a hub secured to said stem and an electric motor, said hub being hollow, clutch means mounted in the hub to form a uni-directional drive connection between the motor and the stem for driving said rotor in one direction only, and remotely disposed control and indicator means for controlling operation of the power operated means to effect said selective positioning of the rotor and for indicating at the remote control position the selected positions of said rotor, said control means including motor cut out switches grouped about said hub, and means on said hub to actuate the switches selectively to stop operation of the motor when the rotor has reached its selected position, and a hand wheel secured directly on said hub and manually operable for rotating the rotor to effect independent manual selection of the position of the rotor without disturbing the drive couple between said power operated means and the rotor, said wheel having marking on its periphery subject to placement relative to fixed indicating media to indicate the selected positioning of the rotor.

5. In apparatus of the character described a rotor having a driver stem projecting therefrom and adapted to be rotated to a plurality of selective positions, a hollow hub secured to said rotor, an electric motor and drive connections between said motor and the rotor including a clutch mounted in said hub, and remotely disposed control means for controlling the motor to effect the selective positioning of the rotor and including motor cut out switches grouped about said hub, and means on said hub to actuate the switches selectively to stop operation of the motor when the rotor has reached its selected position.

6. In apparatus of the character described a rotor having a driver stem projecting therefrom and adapted to be rotated to a plurality of selective positions, a hollow hub secured to said rotor, an electric motor and drive connections between said motor and the rotor including a clutch mounted in said hub, and remotely disposed control means for controlling the motor to effect the selective positioning of the rotor and including motor cut out switches grouped about said hub, and means on said hub to actuate the switches selectively to stop operation of the motor when the rotor has reached its selected position, and a hand wheel secured directly on said hub and manually operable for rotating the rotor to effect independent manual selection of the position of the rotor without disturbing the drive couple between said power operated means and the rotor, said wheel having marking on its periphery subject to placement relative to fixed indicating media to indicate the selected positioning of the rotor.

7. In apparatus of the character described a rotor having a driver stem projecting therefrom and adapted to be rotated to a plurality of selective positions, power operated means for imparting rotation to the rotor for effecting said selective positioning thereof including a hub secured to said stem and an electric motor, said hub being hollow, clutch means mounted in the hub to form a uni-directional drive connection between the motor and the stem for driving said rotor in one direction only, and remotely disposed control and indicator means for controlling operation of the power operated means to effect said selective positioning of the rotor and for indicating at the remote control position the selected positions of said rotor, said control means including motor cut out switches grouped about said hub, and means on said hub to actuate the switches selectively to break the circuit powering the rotor indexing rotation as the rotor reaches its selected position, means for establishing a motor reversing circuit coincidental with the breaking of said circuit, and means for breaking said reversing circuit following a limited amount of reverse operation of said motor without imparting any reverse movement to the rotor.

8. Structure as defined in claim 7 in which the motor reversing means includes a reversing switch, and a friction drag member movable in one direction upon initiation of each valve rotor indexing operation of the motor to actuate the reversing swtich for conditioning a reversing circuit to automatically become effective and reverse the direction of motor operation immediately upon the breaking of the circuit powering the rotor indexing rotation and in the opposite direction incidental to a momentary reversing of the motor to actuate said reversing switch to break said reversing circuit and stop operation of the motor.

9. In apparatus of the character described a casing having a rotor chamber therein rotatably mounted in said chamber and including a stem and being adapted to be rotated to a plurality of selective positions; a drive housing rigidly and removably secured on said casing in spaced relation to said casing and having a drive chamber into which the rotor stem projects, said casing also having means fixedly mounted thereon and marking selective positions to which the rotor is to be turned, a manually operable adjuster wheel mounted on said stem between the casing and housing and marked at its periphery to cooperate with the casing markings in indicating manually selected positions of the rotor, an electric motor mounted on said housing and drive-coupled with the rotor stem within said drive chamber, and a hollow hub secured to the valve rotor and extending into the drive chamber, said drive-couple including a clutch mounted in the hollow hub and drive-coupling the motor with the rotor and permitting turning of the rotor by said wheel without disturbing said drive couple.

10. Structure as defined in claim 9 in which the drive-couple comprises a disk clutch mounted in the hollow hub and drive-coupling the motor with the valve rotor.

11. In apparatus of the character described, casing structure including a rotor chamber and a drive chamber, a rotor rotatable in the rotor chamber and including a stem and being adapted to be rotated to a plurality of selective positions, a hollow hub secured to said stem, an electric motor, a driving head driven by the motor and rotatable in the hollow of the hub and coupled with the hub through uni-directional clutch connections within said hub, a motor reversing switch, said driving head having a flange, a switch actuator frictionally mounted on said flange and movable in one direction with said head to condition the switch for at least in part closing a motor reversing circuit and in the opposite direction with said head following a completion of a motor reversing circuit for actuating the switch to break said circuit, said switch including an actuator button and said frictionally mounted means comprising a cam plate connected by a friction gripping member to said flange and having two circumferentially spaced lugs adapted to alternately come against the switch as stops as the plate turns in one direction or the other with the driving head and a cam surface between said lugs and effective when one lug is in stop contact with the switch to free said button and when the other lug is in stop contact with the switch to press said button.

EMMETT C. HARTLEY.
HENRY E. HULL.

REFERENCES CITED

The following references are of record in the file of this patent:

UNITED STATES PATENTS

| Number | Name | Date |
|---|---|---|
| 550,939 | Blessing | Dec. 10, 1895 |
| 887,253 | Jackson | May 12, 1908 |
| 1,473,634 | Loudon | Nov. 13, 1923 |
| 1,513,457 | Jackson | Oct. 28, 1924 |

(Other references on following page)

UNITED STATES PATENTS

| Number | Name | Date |
|---|---|---|
| 1,614,192 | Ewald | Jan. 11, 1927 |
| 1,864,653 | Jones | June 28, 1932 |
| 1,868,523 | DeFlorez | July 26, 1932 |
| 1,898,242 | Chandler | Feb. 21, 1933 |
| 1,908,763 | Kelty | May 16, 1933 |
| 1,914,333 | Staegemann | June 13, 1933 |
| 1,928,384 | McCanna | Sept. 26, 1933 |
| 1,954,218 | Morrow | Apr. 10, 1934 |
| 1,979,477 | Leland | Nov. 6, 1934 |
| 2,076,321 | Pick | Apr. 6, 1937 |
| 2,146,729 | Gavin | Feb. 14, 1939 |
| 2,235,287 | Daniels | Mar. 18, 1941 |
| 2,314,937 | Hannon | Mar. 30, 1943 |
| 2,327,959 | Cerow | Aug. 24, 1943 |
| 2,336,830 | Allen | Dec. 14, 1943 |
| 2,409,895 | Phelps | Oct. 22, 1946 |
| 2,413,902 | Allen | Jan. 7, 1947 |